United States Patent
Daga et al.

(10) Patent No.: US 11,500,608 B2
(45) Date of Patent: Nov. 15, 2022

(54) SMART AUDIO PLAYBACK

(71) Applicant: Avaya Management L.P., Santa Clara, CA (US)

(72) Inventors: Navin Daga, Silapathar (IN); Sandesh Chopdekar, Pune (IN); Pushkar Yashavant Deole, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/904,042

(22) Filed: Jun. 17, 2020

(65) Prior Publication Data

US 2021/0397404 A1  Dec. 23, 2021

(51) Int. Cl.
*G06F 3/16* (2006.01)
*G10L 15/26* (2006.01)
*G06F 40/284* (2020.01)

(52) U.S. Cl.
CPC .............. *G06F 3/165* (2013.01); *G10L 15/26* (2013.01); *G06F 3/167* (2013.01); *G06F 40/284* (2020.01)

(58) Field of Classification Search
CPC ....... G10L 15/26; G06F 3/165; G06F 40/284; G06F 40/30; G06F 3/167
See application file for complete search history.

(56) References Cited

U.S. PATENT DOCUMENTS

| | | | |
|---|---|---|---|
| 8,966,513 B2 | 2/2015 | John et al. | |
| 9,021,118 B2 | 4/2015 | John et al. | |
| 10,324,979 B2 | 6/2019 | Raanani et al. | |
| 2002/0002562 A1* | 1/2002 | Moran | G06F 16/40 715/203 |
| 2014/0169767 A1* | 6/2014 | Goldberg | G11B 27/031 386/282 |
| 2015/0326688 A1* | 11/2015 | Aarnio | G06F 16/683 707/748 |
| 2019/0362022 A1* | 11/2019 | Haukioja | G06F 16/683 |
| 2020/0159777 A1* | 5/2020 | Weldemariam | H04L 67/306 |
| 2020/0321005 A1* | 10/2020 | Iyer | G10L 15/26 |
| 2021/0073264 A1* | 3/2021 | Vaughn | G06N 20/00 |

FOREIGN PATENT DOCUMENTS

| | | |
|---|---|---|
| JP | 4901738 | 3/2012 |
| KR | 10-2019-0062391 | 6/2019 |

\* cited by examiner

*Primary Examiner* — Angie Badawi
(74) *Attorney, Agent, or Firm* — Sheridan Ross P.C.

(57) ABSTRACT

Embodiments are directed to controlling playback of recordings. The recording can comprise an audio recording, audio/visual recording, voicemail message, or other recording having an audio component. According to one embodiment, a method can comprise capturing an audio recording of speech of at least one person and determining, a context for each of a plurality of portions of the audio recording based on natural language processing of the audio recording. One or more transition points between the portions of the audio recording can be identified. Each transition point can indicate a change in the determined context between the portions. A playback interface providing a representation of the audio recording and each of the identified transition points can be presented and the audio recording can be played based on input received through the playback interface.

17 Claims, 6 Drawing Sheets

SMART AUDIO PLAYBACK

FIELD OF THE DISCLOSURE

Embodiments of the present disclosure relate generally to methods and systems for playback of an audio track or recording and more particularly to controlling playback of an audio recording to locate and provide portions of the recording of interest to the user.

BACKGROUND

In today's fast-tracked world, time taken for a task has become absolutely crucial and task that involve sifting through information to find portions of that information of relevance to the user create inefficiencies. For example, reviewing or sorting through content, such as recordings of voicemails, calls, conferences, etc. quickly can be frustrating and time consuming. Users may try to run through such recording in a hurry by fast forwarding content to listen to the content they are interested in. However, presently the fast forward function of audio playback systems is static in nature where the content is fast forwarded a specific number of seconds or at a specific rate making it harder and time consuming to land at the desired content. Hence, there is a need for improved methods and systems for controlling playback of an audio recording.

BRIEF SUMMARY

Embodiments of the disclosure provide systems and methods for controlling playback of a recording to locate and provide portions of the recording of interest to the user. The recording can comprise an audio recording, audio/visual recording, voicemail message, or other recording having an audio component. According to one embodiment, a method for controlling playback of audio recordings can comprise capturing an audio recording of speech of at least one person and determining a context for each of a plurality of portions of the audio recording based on natural language processing of the audio recording. Determining the context for each of the plurality of portions of the audio recording can comprise transcribing the audio recording into a text transcript, annotating the text transcript based on the natural language processing of the audio recording, and deducing the context for each of the plurality of portions of the audio recording based on the annotated transcript. One or more transition points between the portions of the audio recording can be identified. Each transition point can indicate a change in the determined context between the portions.

A playback interface with a representation of the audio recording and each of the identified transition points can be presented and the audio recording can be played based on input received through the playback interface. For example, the playback interface can comprise a graphical timeline element representing a length of the audio recording. The graphical timeline element can be divided to represent the plurality of portions of the audio recording by one or more graphical transition markers positioned along the timeline element. Each graphical transition marker can correspond to one of the identified one or more transition points and can indicate a point in time within the audio recording for the corresponding transition point. At least one textual context indicator can be provided for each of the plurality of portions of the audio recording. Additionally, or alternatively, one or more textual keyword indicators can also be provided for each of the plurality of portions of the audio recording.

In some cases, the input received through the playback interface can indicate a selected transition point between portions of the audio recording. In such cases, playing the captured audio recording based on the input can comprise fast forwarding to the selected transition point. Additionally, or alternatively, a profile for a user of the playback interface can be read. The profile can define one or more contexts of interest to the user. The input received through the playback interface can indicate a request to fast forward. In such cases, playing the captured audio recording based on the input can comprise fast forwarding to a selected transition point, wherein the selected transition point can be selected based on the profile for the user of the playback interface. In some cases, the profile of the user of the playback interface can be updated based on input received through the playback interface during play of the audio recording.

According to another embodiment, a system can comprise a processor and a memory coupled with and readable by the processor. The memory can have stored therein a set of instructions which, when executed by the processor, causes the processor to control playback of an audio recording by capturing an audio recording of speech of at least one person and determining a context for each of a plurality of portions of the audio recording based on natural language processing of the audio recording. Determining the context for each of the plurality of portions of the audio recording can comprise transcribing the audio recording into a text transcript, annotating the text transcript based on the natural language processing of the audio recording, and deducing the context for each of the plurality of portions of the audio recording based on the annotated transcript. The instructions can cause the processor to identify one or more transition points between the portions of the audio recording. Each transition point can indicate a change in the determined context between the portions.

The instructions can further cause the processor to present a playback interface with a representation of the audio recording and each of the identified transition points and play the audio recording based on input received through the playback interface. For example, the playback interface can comprise a graphical timeline element representing a length of the audio recording. The graphical timeline element can be divided to represent the plurality of portions of the audio recording by one or more graphical transition markers positioned along the timeline element. Each graphical transition marker can correspond to one of the identified one or more transition points and can indicate a point in time within the audio recording for the corresponding transition point. At least one textual context indicator can be provided for each of the plurality of portions of the audio recording. Additionally, or alternatively, one or more textual keyword indicators can also be provided for each of the plurality of portions of the audio recording.

In some cases, the input received through the playback interface can indicate a selected transition point between portions of the audio recording. In such cases, playing the captured audio recording based on the input can comprise fast forwarding to the selected transition point. Additionally, or alternatively, the instructions can cause the processor to read a profile for a user of the playback interface. The profile can define one or more contexts of interest to the user. The input received through the playback interface can indicate a request to fast forward. In such cases, playing the captured audio recording based on the input can comprise fast forwarding to a selected transition point, wherein the selected transition point can be selected based on the profile for the user of the playback interface. In some cases, the instructions can cause the processor to update the profile of the user of the playback interface based on input received through the playback interface during play of the audio recording.

According to yet another embodiment, a non-transitory, computer-readable medium can comprise a set of instructions stored therein which, when executed by a processor, causes the processor to control playback of an audio recording by capturing an audio recording of speech of at least one person and determining a context for each of a plurality of portions of the audio recording based on natural language processing of the audio recording. Determining the context for each of the plurality of portions of the audio recording can comprise transcribing the audio recording into a text transcript, annotating the text transcript based on the natural language processing of the audio recording, and deducing the context for each of the plurality of portions of the audio recording based on the annotated transcript. The instructions can cause the processor to identify one or more transition points between the portions of the audio recording. Each transition point can indicate a change in the determined context between the portions.

The instructions can further cause the processor to present a playback interface with a representation of the audio recording and each of the identified transition points and play the audio recording based on input received through the playback interface. For example, the playback interface can comprise a graphical timeline element representing a length of the audio recording. The graphical timeline element can be divided to represent the plurality of portions of the audio recording by one or more graphical transition markers positioned along the timeline element. Each graphical transition marker can correspond to one of the identified one or more transition points and can indicate a point in time within the audio recording for the corresponding transition point. At least one textual context indicator can be provided for each of the plurality of portions of the audio recording. Additionally, or alternatively, one or more textual keyword indicators can also be provided for each of the plurality of portions of the audio recording.

In some cases, the input received through the playback interface can indicate a selected transition point between portions of the audio recording. In such cases, playing the captured audio recording based on the input can comprise fast forwarding to the selected transition point. Additionally, or alternatively, the instructions can cause the processor to read a profile for a user of the playback interface. The profile can define one or more contexts of interest to the user. The input received through the playback interface can indicate a request to fast forward. In such cases, playing the captured audio recording based on the input can comprise fast forwarding to a selected transition point, wherein the selected transition point can be selected based on the profile for the user of the playback interface. In some cases, the instructions can cause the processor to update the profile of the user of the playback interface based on input received through the playback interface during play of the audio recording.

Figure 1:
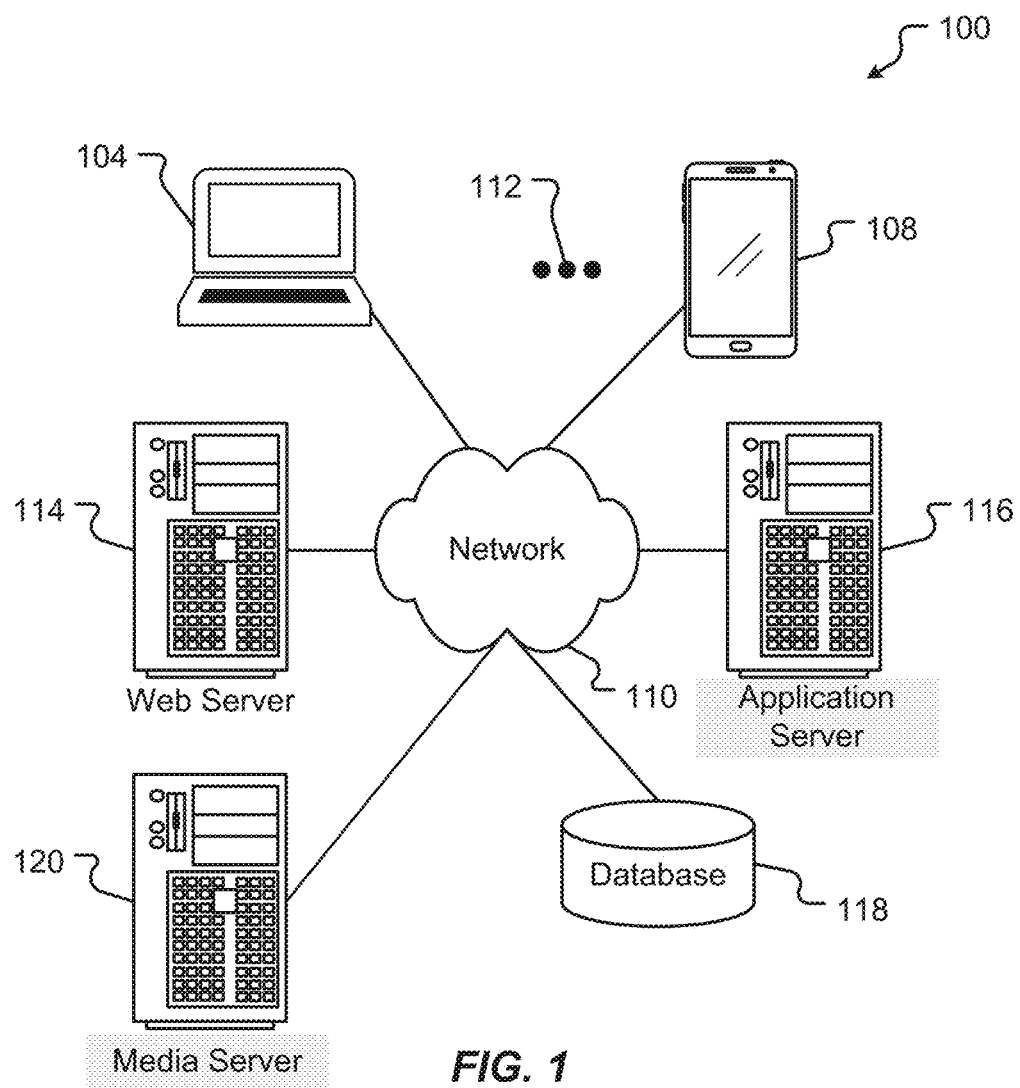
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116, 120. In this example, the servers include a web server 114, an application server 116, and a media server 120. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112 and/or by the web server 114 and/or media server 120. The application server(s) 116 and/or web server 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands. In other implementations, the database can comprise a distributed object database or NoSQL document database used to store non-structured content such as images, video recordings, audio recordings, etc. Such databases can include, for example, MongoDB, Cassandra, and others.

The environment 100 may also include a media server 120. The media server 120 can comprise any one or more one or more general purpose computers capable of executing programs or scripts providing media services to and/or in support of the web server 114 and/or application server(s) 116. For example, the media server 120 and application server 116 may provide through or together with the web server 114 various telecommunication services including but not limited to teleconferencing, video conferencing, voice and/or video calling, voicemail, etc. As will be described in greater detail below, the media server 120 can be adapted to provide access to recording such as audio recordings, video recordings, or other recordings having an audio component stored in the database 118 or within the media server 120 itself and utilize application and/or services including but not limited to natural language processing, artificial intelligence, transcription, etc. executed on the application server(s) 116.

Figure 2:
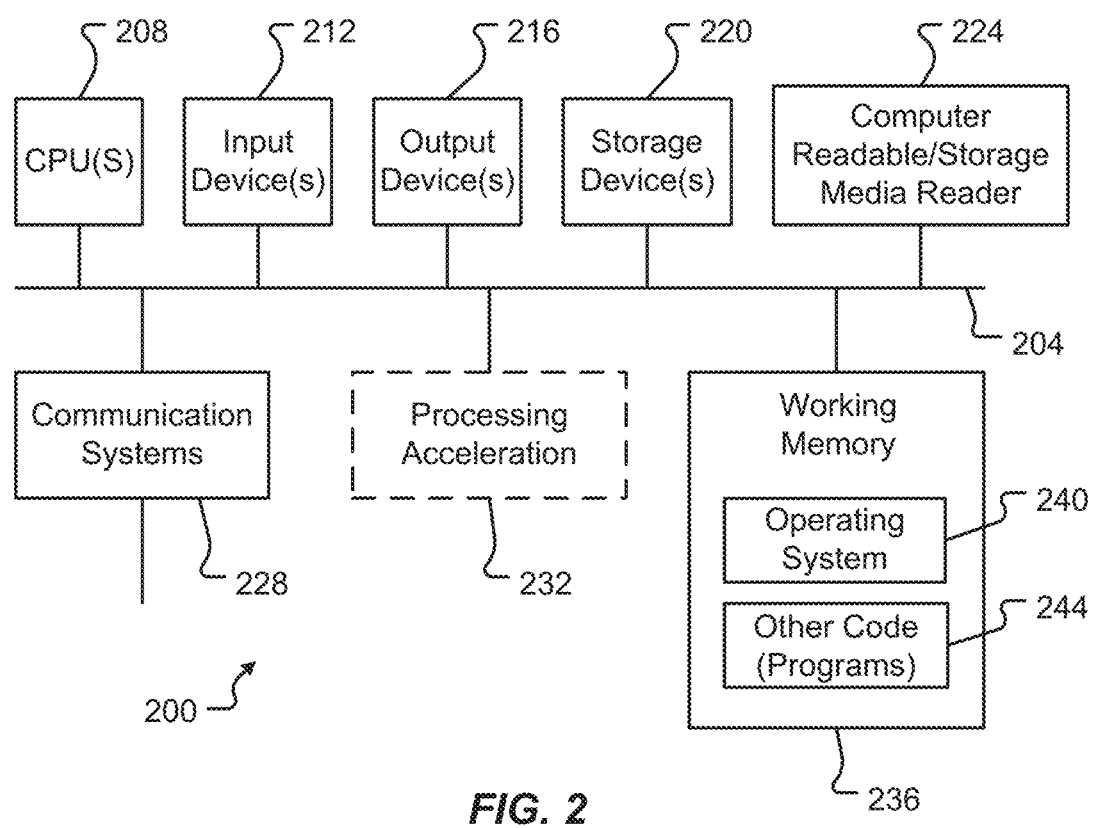
FIG. 2 is a block diagram illustrating elements of an exemplary computing device in which embodiments of the present disclosure may be implemented.

FIG. 2 is a block diagram illustrating elements of an exemplary server or computing device in which one or more portions of embodiments of the present disclosure may be implemented. More specifically, this example illustrates one embodiment of a computer system 200 upon which the web server 114, application server 116, media server 120, user computers, computing devices 104, 108, 112, and/or other systems or components described above with reference to FIG. 1 may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
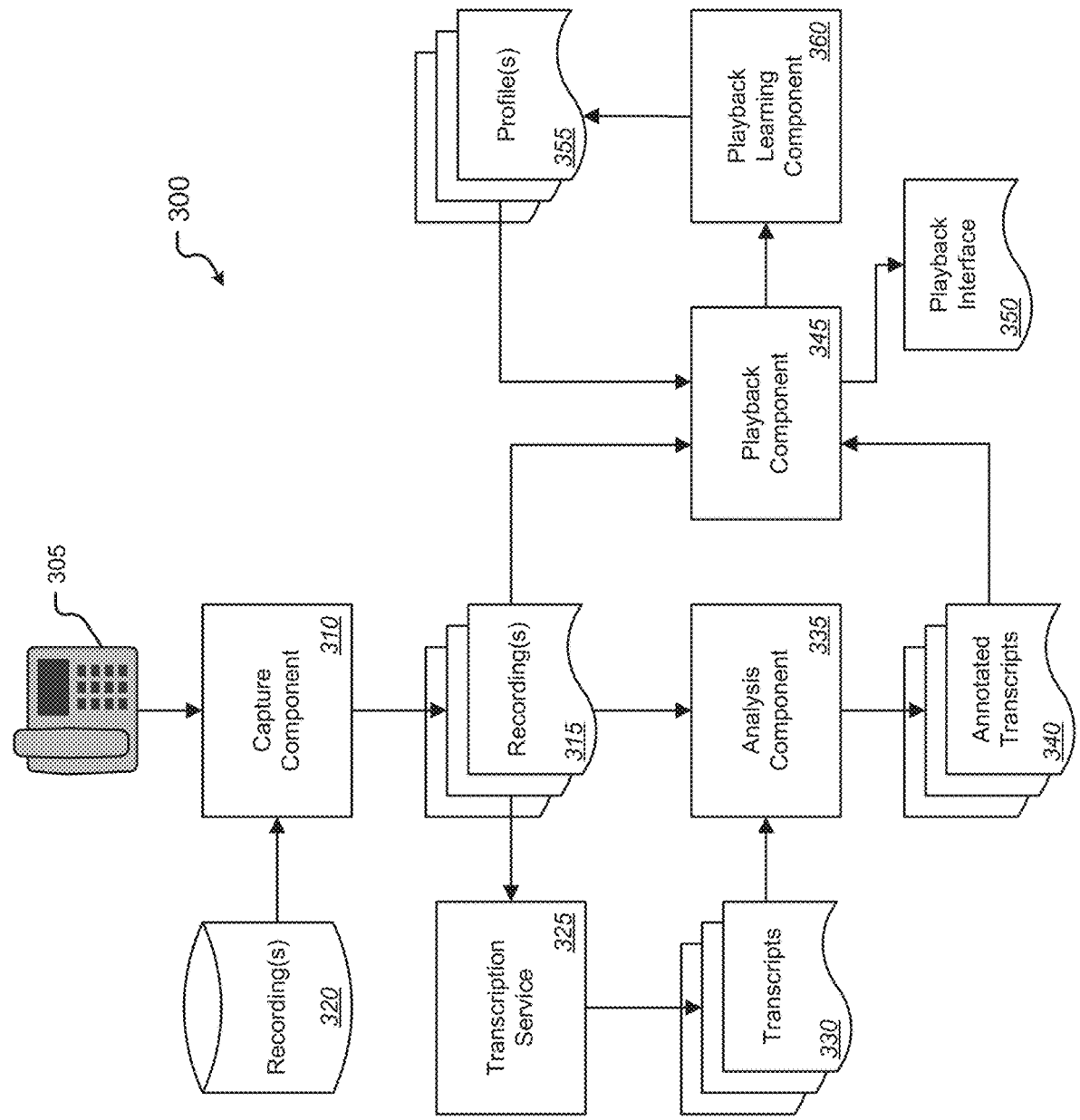
FIG. 3 is a block diagram illustrating elements of an exemplary audio capture and playback system according to one embodiment of the present disclosure.

FIG. 3 is a block diagram illustrating elements of an exemplary audio capture and playback system according to one embodiment of the present disclosure. More specifically, this example illustrates elements of a media processing or other system 300 which can capture, process, and playback audio recording as described herein. Such a system can be implemented on any one or more servers or other computing devices as described above. It should be noted that the various elements illustrated here can execute on more than one co-located or remote systems depending upon the exact implementation and without departing from the scope of the present disclosure.

As illustrated here, the system 300 can include an input device 305 and a capture component 310. The capture component 310 can capture and save one or more audio recordings 315 that include speech of at least one person from an audio stream received from the input device 305. For example, the input device 305 can comprise a telephone, microphone, voicemail system, teleconferencing system, voice conferencing system, and/or any device from which audio can be received such as a smart phone, tablet, laptop, desktop computer, etc. Additionally, or alternatively, the capture component 310, comprise receiving or retrieving previously stored audio streams from a repository 320.

The system can also include an analysis component 335 adapted to determine a context for various portions of the captured audio recordings 315. Generally speaking, a context for each portion of an audio recording 315 can be determined based on natural language processing of the audio recording 315. In order to find certain keywords in the media, additionally, machine learning can also be employed which would be fed with training data for the component to learn from the data. More specifically, determining the context for each portion of the audio recording 315 can comprise transcribing the audio recording, e.g., by a voice-to-text transcription service 325 as known in the art into a text transcript 330. The text transcript can then be annotated by the analysis component 335 based on any of a variety of known natural language processing techniques to generate an annotated transcript 340. For example, the audio recording 315 and/or transcript 330 can be processed to find keywords, intent, sentiment, etc. as known in the art. The analysis component 335 can then deduce the context for each of the plurality of portions of the audio recording 315 based on the annotated transcript 340. For example, based on pauses, changes in intent and/or sentiment, keywords, etc., portions of the audio recording 315 can be identified as introductory chit-chat, opening remarks or purpose of the discussion, any of a range of possible topics and/or sub-topics, closing remarks, next steps, to-do, questions and answers, etc. One or more transition points between the portions of the audio recording 315 can be then identified by the analysis component 335 based on the deduced contexts. Each transition point can indicate a change in the deduced context between the portions and can be identified, for example, by tagging or marking the annotated transcript 340. Additionally, or alternatively, the annotated transcript can be used to modify the original media file or create a copy of media file to insert the transition markers between various portions of the media file.

According to an alternative embodiment, the transcription service 325 may not be used and the text transcripts 330 may not be generated. In this embodiment, speech processing may be performed by the analysis component directly on the recordings 315 through natural language processing which can use computational linguistics, language science, and/or artificial intelligence to understand and interpret human language in the recordings 315. In this way, the analysis component 335 can extract and understand speech and generate transition markers either by modifying the same recording 315 or creating a new recording file (not shown here) with modifications based on the detected transitions.

The system 300 can also include a playback component 345 adapted to playback of the audio recording 315 through a playback interface 350. The playback interface 350 can comprise a graphical interface presented through a webpage, app, or similar interface. Generally speaking, the playback interface 350 can include a representation of the audio recording, e.g., a timeline element representing the length of the recording, and an indication of each of the identified transition points or changes in contexts within the recording. Through the playback interface 350, the user can control the play of an audio recording, including fast forward of the playback based on the determined contexts of the various portions of the audio recording 315 according to embodiments described herein. Additional details of an exemplary playback interface 350 will be described below with reference to FIG. 6.

The system may also maintain a profile 355 for each of one or more users of the system 300. The profile 355 may indicate a set of ranked and/or weighted keywords, contexts, etc. of interest to the user. The profile 355 for the user of the playback interface 350 can be read and used to control playback of the audio recording 315 as will be described. The audio recording 315 can be played based on input received through the playback interface, e.g., through mouse clicks, touch gestures, keystrokes, voice commands, etc.

For example, the input received through the playback interface 350 can indicate a user selection of a specific transition point between portions of the audio recording. For example, the user may click, touch, or otherwise manipulate the playback interface 350 to indicate a selection of a transition point and/or an identified context within the audio recording 315. In such cases, playing the captured audio recording comprise fast forwarding to the selected transition point and/or context and continuing to play the recording at the selected transition point and/or context. In some cases, the user profile can be updated by a playback learning component 360 based on the received input, i.e., to indicate the selected context and/or keywords within that portion of the audio recording 315 as relevant to the user. In other cases, rather than selecting a specific context or transition point in the recording 315, the user may select a fast forward function through the playback interface 350. In such cases, the playback component 345 can automatically select and fast forward to a transition point based on the profile 355 for the user of the playback interface 350. As noted above, the profile 355 can define one or more contexts of interest to the user, e.g., in a set of ranked and/or weighted keywords, contexts, etc. of interest to the user. Based on these definitions, the playback component can select a matching context and/or transition point, fast forward playback to that selected transition point or context, and continue play of the audio recording from that point. As an example, while listening to a recording of quarterly or yearly all-hands meeting of a company, an employee might be interested only in the awards function or another employee might want to listen only to the financials. Accordingly, each employee's profile can be set accordingly and the playback component can directly take them to the audio portion of their interest.

Figure 4:
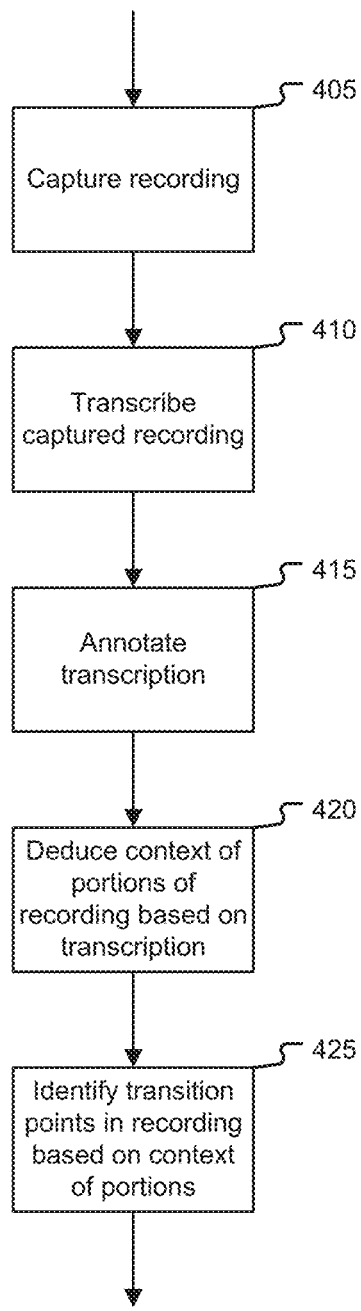
FIG. 4 is a flowchart illustrating an exemplary process for capturing and processing an audio recording according to one embodiment of the present disclosure.

FIG. 4 is a flowchart illustrating an exemplary process for capturing and processing an audio recording according to one embodiment of the present disclosure. As illustrated in this example, the process can begin with capturing 405 an audio recording of speech of at least one person. Capturing 405 the audio recording can comprise, for example, receiving an audio stream from an input device or system such as a telephone, microphone, voicemail system, teleconferencing system, etc. and storing the audio stream in memory. In other cases, capturing 405 the audio recording can comprise receiving or retrieving a previously stored audio stream from memory.

Generally speaking, a context for each of a plurality of portions of the audio recording can then be determined based on natural language processing of the audio recording. More specifically, determining the context for each of the plurality of portions of the audio recording, according to one embodiment, can comprise transcribing 410 the audio recording into a text transcript. Such a text transcript can be created, for example, using any of a variety of voice-to-text transcription functions or services as known in the art and can be correlated to the audio recording based on an elapsed time in the recording. The text transcript can then be annotated 415 based on any of a variety of known natural language processing techniques. For example, the audio recording can be processed to find keywords, intent, sentiment, etc. as known in the art. In another embodiment, the audio recording may not need to be transcribed 410 and converted to text and the speech can directly be passed into the speech analysis component which employs the natural language processing to perform syntactic and semantic analysis and other computational linguistics in order to annotate 415 the audio recording with keywords, context markers. The context can then be deduced 420 for each of the plurality of portions of the audio recording based on the annotated transcript. For example, based on pauses, changes in intent and/or sentiment, keywords, etc., portions of the audio recording can be identified as introductory chit-chat, opening remarks or purpose of the discussion, any of a range of possible topics and/or sub-topics, closing remarks, next steps, to-do, Q&A, etc. One or more transition points between the portions of the audio recording can be then identified 425 based on the deduced contexts. Each transition point can indicate a change in the deduced context between the portions and can be identified, for example, by tagging or marking the annotated transcript.

Figure 5:
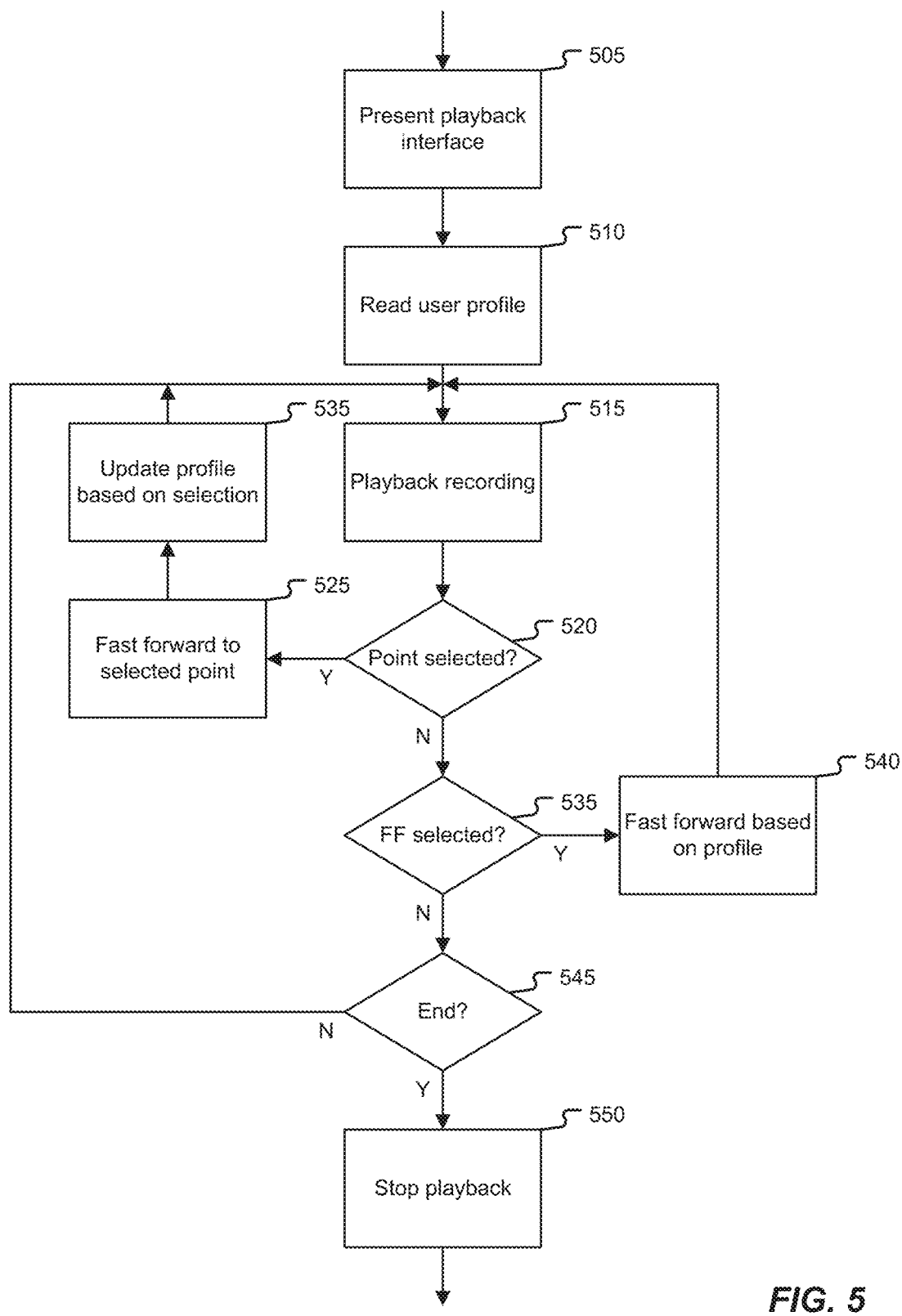
FIG. 5 is a flowchart illustrating an exemplary process for playback of an audio recording according to one embodiment of the present disclosure.

FIG. 5 is a flowchart illustrating an exemplary process for playback of an audio recording according to one embodiment of the present disclosure. As illustrated in this example, playback of the audio recording can begin with presenting 505 a playback interface, e.g., a graphical interface through a webpage, app, or similar interface. Generally speaking, the playback interface can include a representation of the audio recording, e.g., a timeline element representing the length of the recording, and an indication of each of the identified transition points or changes in contexts within the recording. In some cases, a profile for a user of the playback interface can be read 510 and used to control playback of the audio recording as will be described. The audio recording can be played 515 based on input received through the playback interface, e.g., through mouse clicks, touch gestures, keystrokes, voice commands, etc.

In some cases, the input received through the playback interface can indicate a selected transition point between portions of the audio recording. For example, the user may click, touch, or otherwise manipulate the playback interface to indicate a selection of one or the transition points and/or one of the identified contexts within the audio recording. In response to determining 520 a specific transition point or context has been selected, playing the captured audio recording based on the input can comprise fast forwarding 525 to the selected transition point and/or context and continuing to play 515 the recording at the selected transition point and/or context. In some cases, if a user profile has been read 510, the profile can be updated 530 based on the received input. For example, the profile may indicate a set of ranked and/or weighted keywords, contexts, etc. of interest to the user. In such cases, the profile can be updated 530 based on the selected transition point and/or context.

If a determination 520 is made that the received input does not indicate a selection of a specific transition point or context, a determination 535 can be made as to whether a fast forward function has been selected, i.e., without a specifically selected transition point and/or context. For example, the user may click, touch, or otherwise select a fast forward button or other control in the playback interface. In such cases, playing the captured audio recording based on the input can comprise fast forwarding 540 to a transition point automatically selected based on the profile for the user of the playback interface. As described above, the profile can define one or more contexts of interest to the user, e.g., in a set of ranked and/or weighted keywords, contexts, etc. of interest to the user. Based on these definitions, a matching context and/or transition point can be selected, playback can fast forward 540 to that selected transition point or context, and play 515 of the audio recording can continue from that point.

If no input is received through the playback interface a determination 545 can be as to whether an end of the recording has been reached. In response to determining 545 the end of the recording has not been reached, the audio recording can continue to play 515. In response to determining 545 the end of the recording has been reached, playback can be stopped 550

Figure 6:
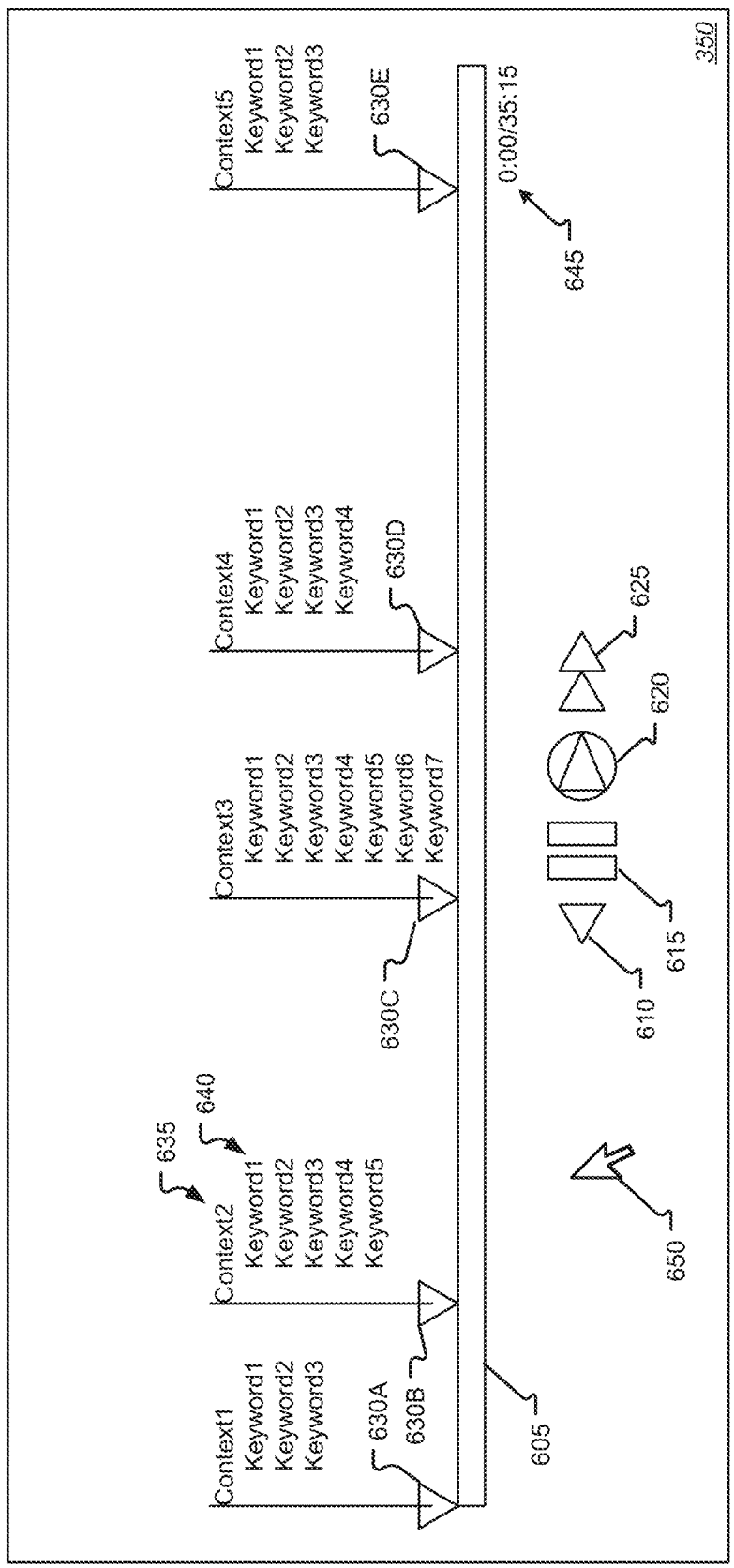
FIG. 6 illustrates an exemplary playback interface according to one embodiment of the present disclosure.

FIG. 6 illustrates an exemplary playback interface according to one embodiment of the present disclosure. As illustrated in this example, the playback interface 350 as introduced above with reference to FIG. 3 can comprise a graphical timeline element 605 representing a length of the audio recording. Generally speaking and as is common with such interfaces, the timeline element 605 may indicate, while a recording is being played, a current time or position in the recording, e.g., by changing a color of a portion of the timeline element 605, by moving a graphical indicator (not shown here) along the timeline element 605, and/or by updating a textual time indicator 645. The playback interface 350 can also include a number of controls as are common in such interfaces including, but not limited to, a reverse or rewind button 610, a pause button 615, a play button 620, and a fast forward button 625.

Also as illustrated in this example, the graphical timeline element 605 can be divided to represent the plurality of portions of the audio recording by one or more graphical transition markers 630A-630E positioned along the timeline element 605. Each graphical transition marker 630A-630E can correspond to one of the identified one or more transition points and can indicate a point in time within the audio recording for the corresponding transition point. At least one textual context indicator 635 can be provided for each of the plurality of portions of the audio recording. Additionally, or alternatively, one or more textual keyword indicators 640 can also be provided for each of the plurality of portions of the audio recording.

In use, a user of the playback interface 350 can manipulate a mouse or other pointing device to move a cursor 650 over various elements of the playback interface and click or otherwise select the element to control playback of the recording. In other cases, touch gestures, spoken command, or other inputs may be used to select elements and control playback of the audio recording. For example, the user may select the play button 620 to begin playback and the pause button 615 to temporarily stop playback. To fast forward, the user may select one of the transition markers, e.g., transition marker 630C, to fast forward to and then play the audio recording from that point. In other cases, the user may click or otherwise select one of the context indicators 635 or keyword indicators 640 to fast forward to that portion of the audio recording. In other cases, the user may select the fast forward button 625. In this case, the playback may fast forward to a portion of the audio recording automatically selected based on the user's profile as described above.

It should be noted that the playback interface 350 as illustrated and described here is offered by way of example only and is not intended to limit the scope of various embodiments of the present disclosure. Rather, it is contemplated that the playback interface 350 may vary significantly in different implementations without departing from the scope of the present invention. For example, the location and/or relative position, number, and appearance of the elements of the playback interface may be different in various implementations. In other implementations, an interface other than a graphical and/or textual interface may be used. For example, an interface such as a keypad of a telephone may be used to control playback of a recording. In such an implementation the user may, for example, press certain numbers, perhaps following or based on voice prompts at the beginning of playback, e.g., "press 1 to rewind, press 3 to fast forward," etc., to fast forward to a portion of the recording of interest. Such variations are considered to be within the scope of the present disclosure.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for controlling playback of audio recordings, the method comprising:
    capturing, by a processor of a media processing system, an audio recording of speech of at least one person;
    determining, by the processor of the media media processing system, one or more keywords and a context for each of a plurality of portions of the audio recording based on natural language processing of the audio recording;
    identifying, by the processor of the media media processing system, one or more transition points between the plurality of portions of the audio recording, each transition point indicating a change in the determined context between the plurality of portions;
    presenting, by the media processing system, a playback interface providing a representation of the audio recording and each of the identified one or more transition points;
    playing, by the media processing system, the audio recording based on input received through the playback interface; and
    updating a user profile associated with a user of the playback interface based on selection of a specific transition point and one or more associated keywords of the specific transition point, wherein the user profile comprises a set of ranked keywords of interest to the user, and wherein updating the user profile comprises re-ranking the set of ranked keywords of interest to the user based on the one or more associated keywords of the selected specific transition point.

2. The method of claim 1, wherein determining the context for each of the plurality of portions of the audio recording comprises transcribing the audio recording into a text transcript, annotating the text transcript based on natural language processing of the text transcript, and deducing the context for each of the plurality of portions of the audio recording based on the annotated text transcript.

3. The method of claim 1, wherein determining the context for each of the plurality of portions of the audio recording comprises annotating the audio recording based on natural language processing of the audio recording and deducing the context for each of the plurality of portions of the audio recording based on the annotated audio recording.

4. The method of claim 1, wherein the playback interface comprises a graphical timeline element representing a length of the audio recording, the graphical timeline element divided to represent the plurality of portions of the audio recording by one or more graphical transition markers positioned along the graphical timeline element, each graphical transition marker corresponding to one of the identified one or more transition points and indicating a point in time within the audio recording for the corresponding one of the identified one or more transition points, at least one textual context indicator for each of the plurality of portions of the audio recording, and one or more textual keyword indicators for each of the plurality of portions of the audio recording.

5. The method of claim 4, wherein playing the audio recording based on the input received through the playback interface comprises fast forwarding to the selected specific transition point.

6. The method of claim 1, further comprising reading the user profile for the user of the playback interface, the user profile defining one or more contexts of interest to the user, wherein the input received through the playback interface indicates a request to fast forward, and wherein playing the audio recording based on the input received through the playback interface comprises fast forwarding to a different transition point, the different transition point being selected based on the one or more contexts of interest to the user.

7. A system comprising:
a processor; and
a memory coupled with and readable by the processor and storing therein a set of instructions which, when executed by the processor, causes the processor to control playback of audio recordings by:
capturing an audio recording of speech of at least one person;
determining one or more keywords and a context for each of a plurality of portions of the audio recording based on natural language processing of the audio recording;
identifying one or more transition points between the plurality of portions of the audio recording, each transition point indicating a change in the determined context between the plurality of portions;
presenting a playback interface providing a representation of the audio recording and each of the identified one or more transition points;
playing the audio recording based on input received through the playback interface; and
updating a user profile associated with a user of the playback interface based on selection of a specific transition point and one or more associated keywords of the specific transition point, wherein the user profile comprises a set of ranked keywords of interest to the user, and wherein updating the user profile comprises re-ranking the set of ranked keywords of interest to the user based on the one or more associated keywords of the selected specific transition point.

8. The system of claim 7, wherein determining the context for each of the plurality of portions of the audio recording comprises:
transcribing the audio recording into a text transcript;
annotating the text transcript based on natural language processing of the text transcript; and
deducing the context for each of the plurality of portions of the audio recording based on the annotated text transcript.

9. The system of claim 7, wherein determining the context for each of the plurality of portions of the audio recording comprises annotating the audio recording based on natural language processing of the audio recording and deducing the context for each of the plurality of portions of the audio recording based on the annotated audio recording.

10. The system of claim 7, wherein playing the audio recording based on the input received through the playback interface comprises fast forwarding to the selected specific transition point.

11. The system of claim 7, wherein the set of instructions further cause the processor to read the user profile for the user of the playback interface, the user profile defining one or more contexts of interest to the user.

12. The system of claim 11, wherein the input received through the playback interface indicates a request to fast forward, and wherein playing the audio recording based on the input received through the playback interface comprises fast forwarding to a different transition point, the different transition point being selected based on the one or more contexts of interest to the user.

13. A non-transitory, computer-readable medium comprising a set of instructions stored therein which, when executed by a processor, causes the processor to control playback of audio recordings by:
capturing an audio recording of speech of at least one person;
determining one or more keywords and a context for each of a plurality of portions of the audio recording based on natural language processing of the audio recording;
identifying one or more transition points between the plurality of portions of the audio recording, each transition point indicating a change in the determined context between the plurality of portions;
presenting a playback interface providing a representation of the audio recording and each of the identified one or more transition points;
playing the audio recording based on input received through the playback interface; and
updating a user profile associated with a user of the playback interface based on selection of a specific transition point and one or more associated keywords of the specific transition point, wherein the user profile comprises a set of ranked keywords of interest to the user, and wherein updating the user profile comprises re-ranking the set of ranked keywords of interest to the user based on the one or more associated keywords of the selected specific transition point.

14. The non-transitory, computer-readable medium of claim 13, wherein determining the context for each of the plurality of portions of the audio recording comprises:
transcribing the audio recording into a text transcript;
annotating the text transcript based on natural language processing of the text transcript; and
deducing the context for each of the plurality of portions of the audio recording based on the annotated text transcript.

15. The non-transitory, computer-readable medium of claim 13, wherein playing the audio recording based on the input received through the playback interface comprises fast forwarding to the selected specific transition point.

16. The non-transitory, computer-readable medium of claim 15, wherein the set of instructions further cause the processor to read the user profile for the user of the playback interface, the user profile defining one or more contexts of interest to the user.

17. The non-transitory, computer-readable medium of claim 16, wherein the input received through the playback interface indicates a request to fast forward, and wherein playing the audio recording based on the input received through the playback interface comprises fast forwarding to a different transition point, the different transition point being selected based on the one or more contexts of interest to the user.

\* \* \* \* \*